(12) United States Patent
Pearl (10) Patent No.: US 7,956,769 B1
(45) Date of Patent: Jun. 7, 2011

(54) METHOD AND SYSTEM FOR RESERVATION-BASED PARKING

(75) Inventor: Michael L. Pearl, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 278 days.

(21) Appl. No.: 12/263,822

(22) Filed: Nov. 3, 2008

(51) Int. Cl.
*B60Q 1/48* (2006.01)

(52) U.S. Cl. ............. 340/932.2; 340/539.1; 340/539.11; 340/933

(58) Field of Classification Search ............... 340/932.2, 340/539.1, 539.11; 705/28, 1.1, 26
See application file for complete search history.

(56) References Cited

U.S. PATENT DOCUMENTS

| | | | |
|---|---|---|---|
| 2004/0068433 A1* | 4/2004 | Chatterjee et al. | 705/13 |
| 2006/0250278 A1* | 11/2006 | Tillotson et al. | 340/932.2 |
| 2007/0129974 A1* | 6/2007 | Chen et al. | 705/5 |

\* cited by examiner

*Primary Examiner* — Daryl Pope
(74) *Attorney, Agent, or Firm* — Park, Vaughan, Fleming & Dowler LLP; Chia-Hsin Suen (57) ABSTRACT

Some embodiments of the present invention provide a system that facilitates parking usage. During operation, the system receives a parking reservation request from a user and obtains a set of available parking spaces based on the parking reservation request. Next, the system provides the available parking spaces to the user and obtains, from the user, a selection of a parking space from the available parking spaces. Finally, the system reserves the parking space for the user.

23 Claims, 7 Drawing Sheets

METHOD AND SYSTEM FOR RESERVATION-BASED PARKING

BACKGROUND

Related Art

The present invention relates to a system for reserving parking spaces.

The activities of customers and businesses can be highly influenced by the availability of parking. In particular, a customer may choose to patronize certain businesses because of the convenience of parking facilities at or near the businesses. Similarly, the availability of parking for a business may affect the business's ability to attract customers and/or price goods and services at a certain level.

In addition, lack of information regarding parking availability may adversely impact both customers and businesses. For example, a customer may avoid certain activities (e.g., events, restaurants, nightlife, etc.) because of the perceived lack of parking for the activities. As a result, the customer may forgo such activities even if parking is available. On the other hand, customers who frequent areas with high parking demand (e.g., congested urban areas) may be forced to spend considerable amounts of time and money in obtaining parking in such areas.

Along the same lines, a business may experience reductions in revenue because of a perceived lack of parking, regardless of the actual availability of parking at or near the business. Conversely, a business that does not provide adequate parking facilities may create a potential inconvenience for customers who cannot park near the business. The inconvenience may further detract from the business's reputation and cause the business to lose customers.

SUMMARY

Some embodiments of the present invention provide a system that facilitates parking usage. During operation, the system receives a parking reservation request from a user and obtains a set of available parking spaces based on the parking reservation request. Next, the system provides the available parking spaces to the user and obtains, from the user, a selection of a parking space from the available parking spaces. Finally, the system reserves the parking space for the user.

In some embodiments, the system also validates the use of the parking space by the user.

In some embodiments, the user is validated with at least one of a phone number, a login, a license plate number, a credit card number, an identification card, and a vehicle transponder.

In some embodiments, reserving the parking space for the user involves at least one of:
 (i) reserving a specific parking space from the available parking spaces for the user;
 (ii) decreasing a number of remaining available parking spaces from the available parking spaces;
 (iii) receiving an auction bid for the parking space from the user;
 (iv) receiving payment from the user; and
 (v) identifying the user.

In some embodiments, the parking reservation request is associated with at least one of a location, a time, a duration, a price, an activity, and an event.

In some embodiments, providing the available parking spaces to the user involves displaying the available parking spaces on a map.

In some embodiments, the selection of the parking space is obtained using at least one of a webpage, an email, a phone call, and a Short Message Service (SMS) transmission.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the present invention provide a method and system for facilitating parking usage. More specifically, embodiments of the present invention provide a method and system for reserving parking spaces. The parking spaces may be listed by a business such as a restaurant, venue, store, and/or parking garage. Furthermore, the parking spaces may be located in a private parking lot or in a public parking garage.

To reserve a parking space, a user (e.g., a customer) may make a parking reservation request. The parking reservation request may correspond to a search that includes parameters such as a location, a time, a duration, a price, an activity, and/or an event. The user may then receive a set of available parking spaces based on the parking reservation request and select a parking space from the available parking spaces. The user may also reserve the parking space by paying for the parking space and/or supplying authentication credentials such as a license plate number, a credit card number, an identification card, and/or a vehicle transponder. The authentication credentials may also be used to validate the use of the parking space by the user.

Figure 1:
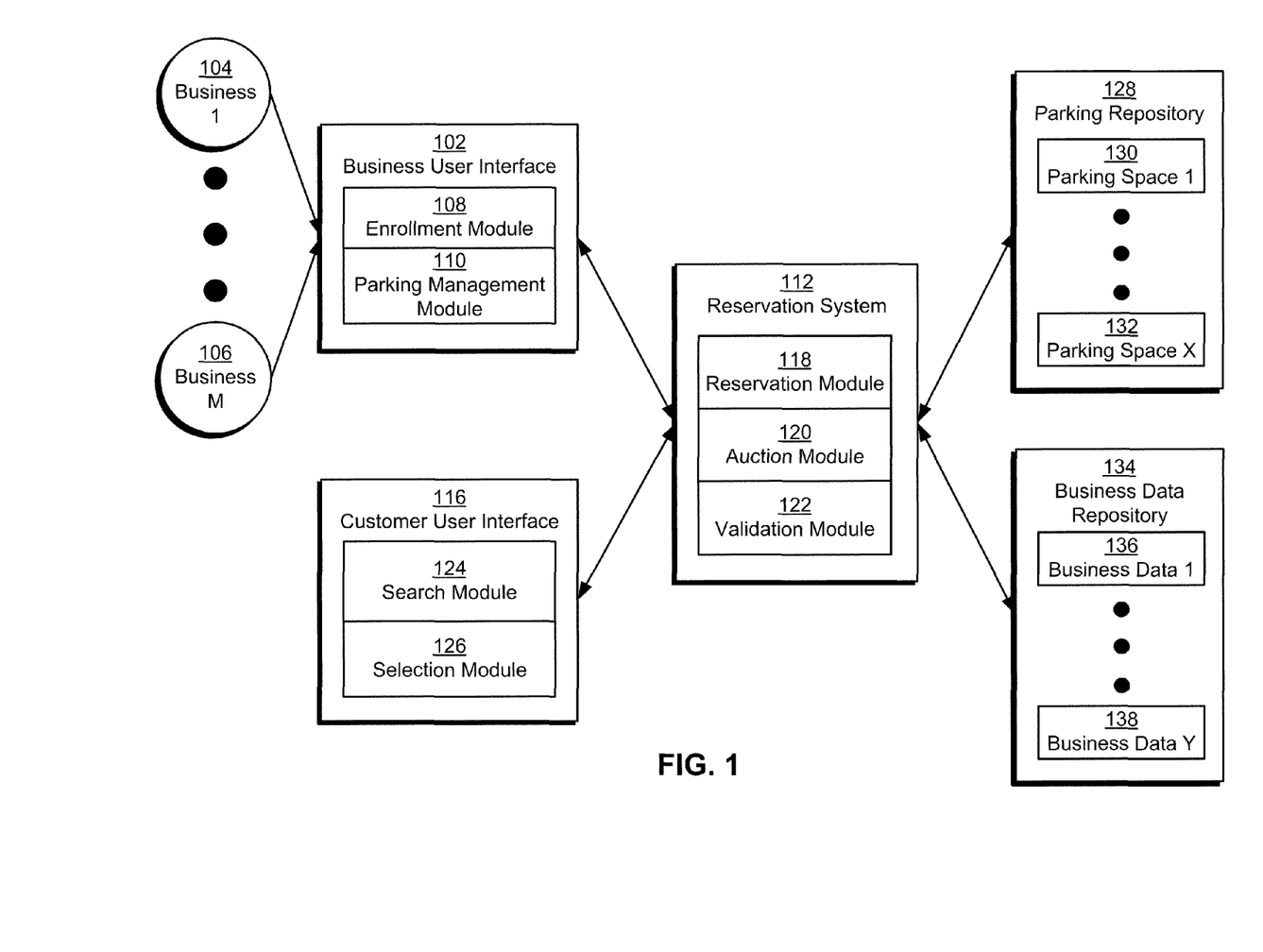
FIG. 1 shows a schematic of a system in accordance with an embodiment of the present invention.

FIG. 1 shows a schematic of a system in accordance with an embodiment of the present invention. In particular, FIG. 1 shows a system for providing reservation-based parking in accordance with an embodiment of the present invention. As shown in FIG. 1, the system includes a reservation system 112, a business user interface 102, a customer user interface 116, a parking repository 128, and a business data repository 134. Each of these components is described in further detail below.

Reservation system 112 may facilitate parking usage between users and businesses (e.g., business 1 104, business m 106). More specifically, reservation system 112 may allow businesses such as restaurants, stores, parking garages, and/or venues to list parking spaces with reservation system 112. For example, a restaurant may list a set of parking spaces on a private parking lot with reservation system 112 so that customers of the restaurant may reserve parking spaces from the available parking spaces. The restaurant may also allow non-customers of the restaurant to reserve parking spaces at higher prices than those paid by customers.

Reservation system 112 may also allow users to search for available parking spaces from the listed parking spaces and reserve a parking space from the available parking spaces. For example, a user may access reservation system 112 to reserve a parking space for an event such as a baseball game. The user may search for available parking spaces within a certain radius of the baseball game and/or during the date and time of the baseball game. Finally, the user may select and reserve a parking space from the available parking spaces using reservation system 112.

In one or more embodiments of the invention, reservation system 112 is implemented using a client-server architecture. More specifically, reservation system 112 may be executed on one or more servers. In addition, reservation system 112 may be accessed from other machines using a web browser and network connection. Alternatively, reservation system 112 may be locally installed on a computing system, such as a personal computer (PC), mobile phone, personal digital assistant (PDA), and/or other digital computing device of the user.

To interact with the users, reservation system 112 may include a customer user interface 116 (e.g., graphical user interface (GUI), web-based user interface, etc.) that is accessed by the users. To use reservation system 112, the users may navigate through one or more screens of customer user interface 116 and interact with user interface elements such as form fields, calendar widgets, radio buttons, menus, and/or checkboxes. For example, customer user interface 116 may allow the users to enroll with reservation system 112, manage user accounts with reservation system 112, browse or search for available parking spaces, and/or reserve parking spaces.

Those skilled in the art will appreciate that reservation system 112 may interact with the users through a variety communications media. In other words, access to customer user interface 116 may not be restricted to standard user interfaces for applications, such as GUIs or web-based user interfaces. As a result, customer user interface 116 may also be accessed by the users through mechanisms such as email, phone calls, and/or Short Message Service (SMS) transmissions. For example, a user may interact with reservation system 112 by sending an email or SMS message containing a set of keywords for reserving a parking space in lieu of loading a webpage in a web browser or running an application installed on a PC. Along the same lines, the user may issue voice commands to an interactive voice response (IVR) system during a phone call instead of transmitting text data to reservation system 112.

As mentioned above, reservation system 112 may allow businesses (e.g., business 1 104, business m 106) to list parking spaces on reservation system 112. As a result, reservation system 112 may include mechanisms for enabling interaction with the businesses, such as business user interface 102. As with customer user interface 116, business user interface 102 may correspond to a GUI or web-based user interface that includes one or more screens and one or more user interface elements, or an interface that is accessed through email, phone, SMS, and/or another communications mechanism.

Within business user interface 102, an enrollment module 108 may allow the businesses to enroll in reservation system 112. In one or more embodiments of the invention, enrollment of a business in reservation system 112 involves creating an account for the business on reservation system 112. Enrollment of the business may also involve obtaining business data (e.g., business data 1 136, business data y 138) associated with the business from the business, such as a business name, a business location, contact information, business hours, and/or a business description. The business data may be stored in business data repository 134 for future retrieval and presentation to the users and/or businesses.

To list parking spaces in reservation system 112, the businesses may use a parking management module 110 within business user interface 102. In particular, reservation system 112 may obtain a set of parking spaces (e.g., parking space 1 130, parking space x 132) from a business through parking management module 110 and store the available parking spaces in parking repository 128. The parking spaces may be obtained as a list, a map, a number (e.g., 50 parking spaces), and/or other format provided by the business. For example, the business may manually enter a list of available parking spaces and associated identifiers (e.g., parking space numbers) and/or upload a map of a parking garage through parking management module 110.

Moreover, businesses may only provide some of their parking spaces to reservation system 112. For example, an airport parking business may list only one of several parking garages with reservation system 112. The remaining parking garages may be reserved for walk-ins, the airport parking business's private reservation system, and/or certain (e.g., corporate) customers.

Conversely, reservation system 112 may be used as a private parking reservation system for a business or a group of partner businesses. In other words, enrollment in reservation system 112 may be restricted to only the business or partner businesses, and parking spaces listed on reservation system 112 may be provided entirely by the business or partner businesses. For example, a group of restaurants in a neighborhood may use reservation system 112 as a private parking reservation system for customers who plan to dine at one of the restaurants.

The businesses may also specify a schedule of fees for parking spaces using parking management module 110. For example, a business may provide two parking rates for all parking spaces: a weekday parking rate and a weekend or holiday parking rate. Alternatively, a business may price parking spaces differently based on the location, size, security, weather protection, and/or other properties of each parking space. If no fee schedule is provided by the business, reservation system 112 may automatically set a default parking rate for the business or a parking rate that is based on factors such as demand, location, and/or special events. The parking rates may be stored in parking repository 128 along with the parking spaces, or the parking rates may be stored in a separate repository and cross-referenced with the parking spaces in parking repository 128. For example, parking spaces and parking rates may be combined from separate relational databases and/or database tables using a join clause.

Once parking repository 128 is populated with parking spaces from the businesses, users may reserve one or more of the parking spaces using reservation system 112 and/or customer user interface 116. In particular, each user may send a parking reservation request to reservation system 112. The parking reservation request may correspond to a search that is conducted through a search module 124 in customer user interface 116. For example, the user may conduct a search using one or more form fields in a webpage provided by search module 124. Alternatively, the user may send the parking reservation request to reservation system 112 in an SMS message using a mobile phone.

In one or more embodiments of the invention, the parking reservation request includes search parameters for available parking spaces. The search parameters may correspond to a location (e.g., address, postal code, neighborhood, etc.), time (e.g., date, date range, etc.), duration (e.g., number of hours, number of days, etc.), price (e.g., maximum price per hour), activity (e.g., dinner, dancing, movie, excursion), and/or event (e.g., fair, festival, athletic event, concert, etc.). For example, the parking reservation request may allow the user to reserve a parking space in conjunction with a dinner reservation.

Search module 124 may obtain a set of available parking spaces from reservation system 112 based on the parking reservation request (e.g., search parameters). For example, search module 124 may receive available parking spaces as a subset of the listed parking spaces in reservation system 112 that are within walking radius of a baseball stadium. The available parking spaces may further be narrowed based on factors such as date and time, and/or events (e.g., baseball games) that occur at specific dates and times. The available parking spaces may then be provided to the user by a selection module 126 in customer user interface 116.

In one or more embodiments of the invention, selection module 126 provides the available parking spaces to the user by displaying the available parking spaces on a map. The map may be displayed within a web browser or an application. Furthermore, the user may interact with the map to view the available parking spaces. For example, the user may view the available parking spaces by dragging the map, zooming in or out of the map, and/or clicking on elements of the map. Display of available parking spaces on a map is discussed in detail below with respect to FIGS. 2A-2C.

Those skilled in the art will appreciate that selection module 126 may include functionality to provide available parking spaces to the user via means other than a map. For example, selection module 126 may provide available parking spaces relevant to the user's parking reservation request in a list within a webpage, email, and/or SMS message. Selection module 126 may also use an IVR system to recite the list in a phone call with the user.

Selection module 126 may additionally include functionality to obtain the user's selection of a parking space from the available parking spaces. For example, the user may select one of 100 available parking spaces at a private parking lot displayed on a map provided by selection module 126. Alternatively, the user may select a specific parking space from a set of available parking spaces in a parking garage by clicking on the parking space within a map of the parking garage and/or providing a unique identifier (e.g., parking space number) for the parking space.

Reservation system 112 may then reserve the selected parking space for the user using a reservation module 118. The parking space may be reserved for a time and duration (e.g., reservation period) specified by the user in search module 124 and/or provided by the user in selection module 126. For example, reservation module 118 may reserve the parking space for a reservation period of three hours starting on a given time of a given day, based on search parameters for date, time, and duration entered into search module 124 by the user.

Reservation module 118 may also update one or more repositories (e.g., parking repository 128) with the parking space reservation. For example, if the user has selected a specific parking space in a parking lot, reservation module 118 may reserve the parking space for the user by updating the parking space's entry in parking repository 128 with a "reserved" status for the reservation period of the parking space reservation. Reservation module 118 may also decrease the number of remaining available parking spaces from the available parking spaces for the reservation period in parking repository 128. For example, if the user reserves the parking space from a parking lot with 20 available spaces, reservation system 112 may decrease the number of available spaces at the parking lot to 19.

The parking space reservation may also be implemented by updating data in multiple repositories and cross-referencing the data. For example, the parking space may be reserved by updating the entry for the parking space in parking repository 128, decreasing the number of available parking spaces for a business in business data repository 134, and/or adding a reservation to an entry for the user in a user data repository. The updated entries in each repository may then be cross-referenced using techniques such as relational database foreign keys.

Reservation module 118 may also identify the user using one or more authentication credentials and reserve the parking spot under the authentication credentials. The authentication credentials may include the user's phone number, login with reservation system 112, license plate number, credit card number, identification card, and/or vehicle transponder to generate a parking space reservation for the user. Moreover, the authentication credentials may be obtained in a variety of ways. For example, the user's credit card number may be stored on the user's mobile phone and transmitted to reservation module 118 along with the user's mobile number to reserve the parking space. Alternatively, the user may scan his/her vehicle transponder at a scanner (e.g., a radio frequency identification (RFID) reader) to reserve the parking space under a unique identifier for the vehicle transponder. As with other components of the parking reservation, the authentication credentials may be stored in parking repository 128, under the user's account with reservation system 112 (if the account exists), and/or in a separate (e.g., encrypted) repository maintained by reservation system 112.

In addition, reservation module 118 may receive payment from the user for the parking space. The payment may correspond to the full cost of using the parking space during the period reserved for the user, or the payment may correspond to a deposit that is forfeited if the user does not show up for the reservation. The payment may be obtained from a variety of sources, including the user's credit card number, vehicle transponder, and/or from a funds account for the user on reservation system 112. The payment may further ensure the user's reservation of the parking space by providing parking revenue to the business listing the parking space prior to use of the parking space. For example, a deposit may allow the business to temporarily hold the parking space for the user from the beginning of the reservation period (e.g., for one hour), while full payment of parking costs for the reservation period may allow the business to hold the parking space for the user during the entire reservation period.

In one or more embodiments of the invention, reserving the parking space for the user involves receiving an auction bid for the parking space from the user. In other words, reservation system 112 may include an auction module 120 that conducts auctions for one or more parking spaces in parking repository 128. The auctions may be conducted for parking space reservations during peak hours, special events, and/or holidays. Auctions may also be conducted for the best parking spaces in a parking lot or parking garage. As a result, reservation module 118 may reserve the parking space for the user if the user places the winning bid in an auction for the parking space, as determined by auction module 120.

Reservation system 112 may also include functionality to validate the use of the parking space by the user. As discussed above, the parking space reservation may be made under one or more authentication credentials for the user. The authentication credential(s) may later be used by a validation module 122 in reservation system 112 to allow or deny use of the parking space during the reservation period specified by the parking space reservation. For example, the user may reserve the parking space in a parking garage using his/her license plate number. To validate the user, a camera and/or computer system at the parking garage may obtain the user's license plate number from his/her car using optical character recognition (OCR) technology. The user's license plate number then may be transmitted to validation module 122, which may verify the validity of the license plate number on the car. In other words, the user may be permitted to use the parking space if the license plate number from the car matches the license plate number under the parking space reservation.

Figure 2A:
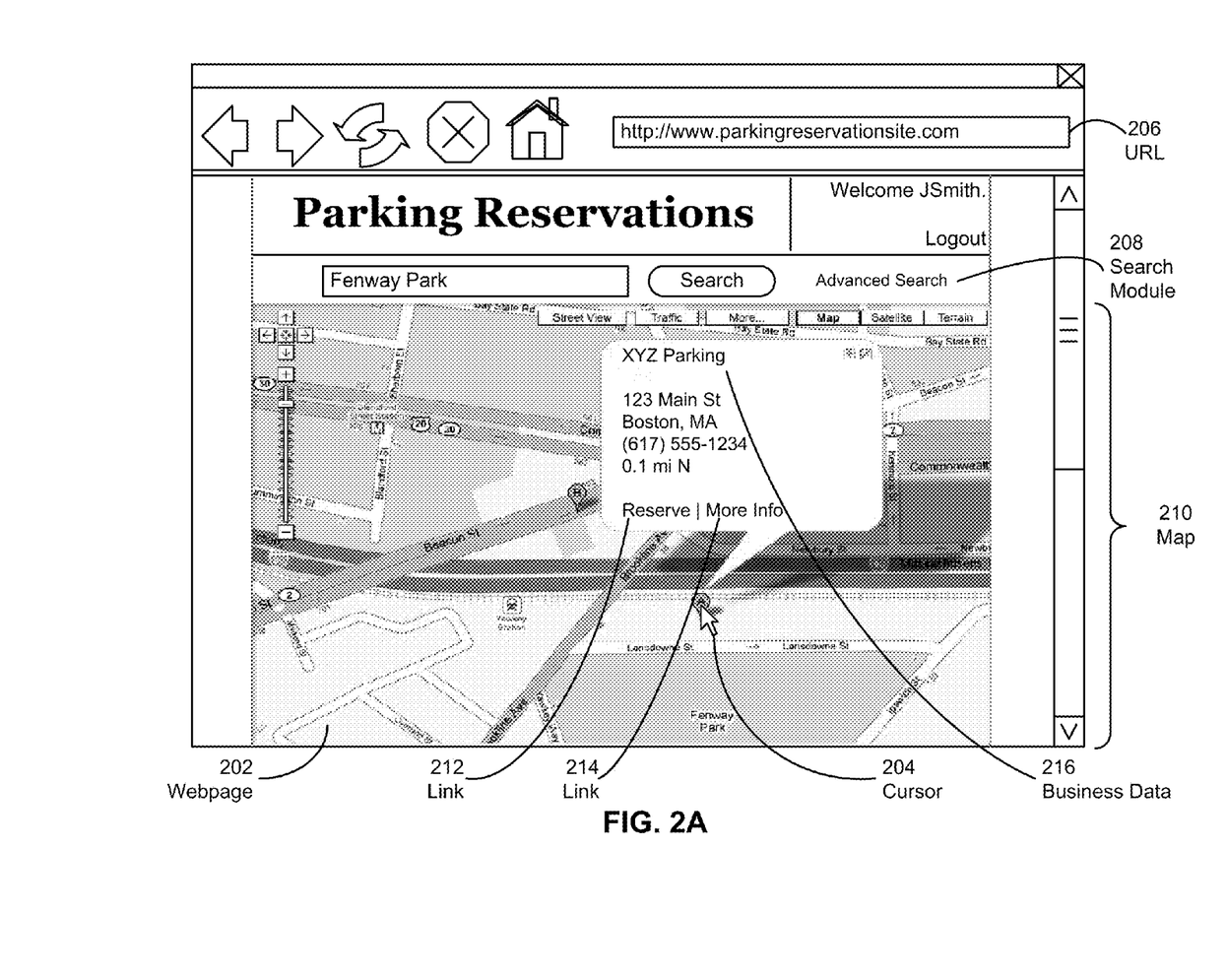
FIG. 2A shows an exemplary screenshot in accordance with an embodiment of the present invention.

FIG. 2A shows an exemplary screenshot in accordance with an embodiment of the present invention. More specifically, FIG. 2A shows a screenshot of a web-based user interface for reserving parking spaces. As shown in FIG. 2A, the web-based user interface is provided by a webpage 202 within a web browser. Furthermore, webpage 202 may be obtained from a Universal Resource Locator (URL) 206 by the web browser. For example, webpage 202 may correspond to a homepage or front page of a parking reservation website located at URL 206.

Within webpage 202, a search module 208 may allow a user to provide a parking reservation request. More specifically, search module 208 may obtain a set of search parameters (e.g., "Fenway Park") from the user and obtain a set of available parking spaces for the user based on the search parameters. Search module 208 may also include access to other options (e.g., "Advanced Search") for searching and/or browsing for available parking spaces.

Webpage 202 also shows a map 210 based on the search parameters entered into search module 208 by the user. As described above, map 210 may correspond to an interactive map. In other words, the user may drag map 210, zoom in and out of map 210, and/or select various elements in map 210 using a cursor 204, keyboard, and/or other input mechanism. The interactive nature of map 210 may also allow the user to view and/or access available parking spaces associated with the search parameters.

In particular, the user may select an element (e.g., a pushpin) in map 210 using cursor 204 to view parking-related information for the element. As shown in FIG. 2A, business data 216 associated with a business is shown above the element. Business data 216 includes a business name (e.g., "XYZ Parking"), a business address (e.g., "123 Main St, Boston, Mass."), and a telephone number for the business (e.g., "(617) 555-1234"). Business data 216 also includes a distance (e.g., "0.1 mi N") from a location specified in the search parameters. As a result, business data 216 may allow the user to determine the suitability of reserving a parking space at the business.

Two links 212-214 are also displayed above the selected element in map 210. Link 212 (e.g., "Reserve") may allow the user to begin the reservation process for a parking space provided by the business, while link 214 (e.g., "More Info") may allow the user to view additional information associated with the business. For example, link 214 may allow the user to view the business's parking rates, the number of parking spaces listed by the business, and/or reviews of the business.

Figure 2B:
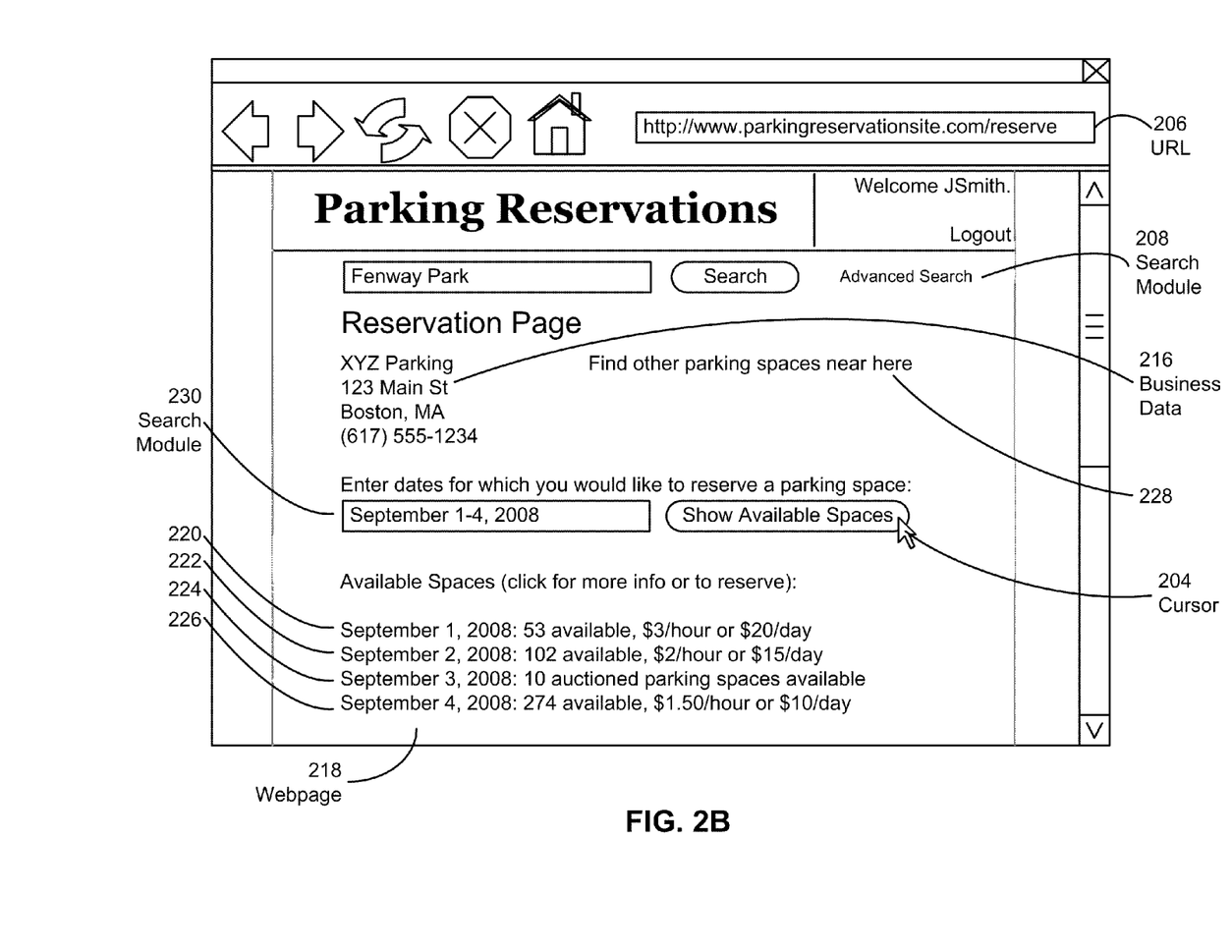
FIG. 2B shows an exemplary screenshot in accordance with an embodiment of the present invention.

FIG. 2B shows an exemplary screenshot in accordance with an embodiment of the present invention. In particular, FIG. 2B shows a screenshot of a parking reservation webpage 218. Webpage 218 may be accessed by selecting link 212 of FIG. 2A using cursor 204 and/or another input mechanism. Moreover, webpage 218 may allow the user to begin the reservation process for a parking space with the business represented by business data 216. Webpage 218 may also allow the user to find other parking spaces near the business represented by business data 216 by selecting an element 228 next to business data 216.

As shown in FIG. 2B, webpage 218 includes a second search module 230 that allows the user to search for parking availability within one or more reservation dates (e.g., "Sep. 1-4, 2008"). The user may submit the reservation dates to webpage 218 by selecting a button (e.g., "Show Available Spaces") using cursor 204. Alternatively, the user may specify reservation dates under search module 208 in webpage 202 or webpage 218.

Available parking spaces (e.g., search results) for the reservation dates entered into search module 230 are shown below search module 230 in webpage 218 as elements 220-226. The user may select an element 220-226 using cursor 204 and/or another input mechanism to obtain more information about parking space reservations and/or to reserve a parking space for the corresponding reservation date.

More specifically, element 220 indicates that 53 parking spaces are available for $3 an hour or $20 a day on Sep. 1, 2008. Element 222 indicates that 102 parking spaces are available for $2 an hour or $15 a day on Sep. 2, 2008. Element 224 indicates that only ten auctioned parking spaces are available on Sep. 3, 2008, and element 226 shows that 274 parking spaces are available for $1.50 an hour or $10 a day on Sep. 4, 2008. As a result, webpage 218 may include different parking rates for different days based on a fee schedule provided by the business, demand, availability, and/or other factors.

The user may instantly reserve parking spaces for Sep. 1, Sep. 2, and Sep. 4, 2008 by clicking on the corresponding elements in webpage 218. However, the user may not be guaranteed a parking space on Sep. 3, 2008 unless the user wins one of the ten auctioned parking spaces on that date. As a result, the user may attempt to reserve a parking space on Sep. 3, 2008 by selecting element 224 and placing an auction bid for one or more of the auctioned parking spaces on a webpage to which element 224 links.

Figure 2C:
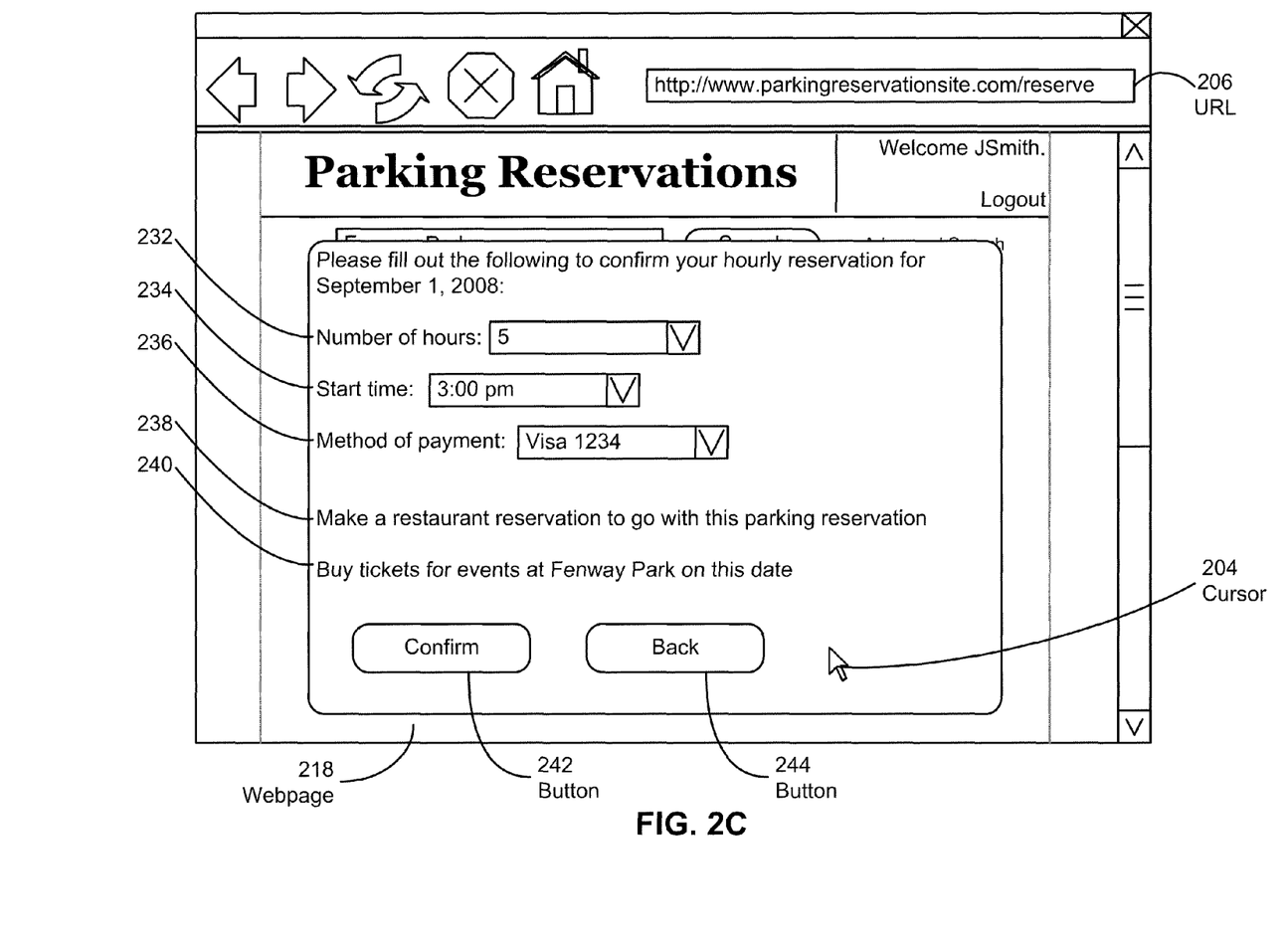
FIG. 2C shows an exemplary screenshot in accordance with an embodiment of the present invention.

FIG. 2C shows an exemplary screenshot in accordance with an embodiment of the invention. More specifically, FIG. 2C shows webpage 218 after the user has selected a portion of element 220 (e.g., "$3/hour") to proceed with an hourly reservation of a parking space on Sep. 1, 2008. To complete the reservation process for the user, a reservation form is displayed within webpage 218.

The reservation form includes a number of fields 232-236 for obtaining reservation information from the user. In particular, field 232 requests a number of hours (e.g., "5") for which the reservation will be made. Field 234 requests a start time (e.g., "3:00 pm") for the reservation, and field 236 requests a method of payment (e.g., "Visa 1234") for the reservation. The user may enter information into fields 232-236 by selecting an option from a drop-down menu for each field. Alternatively, fields 232-236 may correspond to form fields that receive text input from the user.

The reservation form also includes a number of options 238-240 that may be included with the parking space reservation. In particular, option 238 may allow the user to make a restaurant reservation along with the parking reservation. For example, option 238 may allow the user to access a webpage that searches for and reserves spots at restaurants near the parking space. Similarly, option 240 may allow the user to buy tickets at a venue (e.g., "Fenway Park") supplied by the user in search module 208. Alternatively, the user may fill out the reservation form of FIG. 2C after making accompanying restaurant and/or event reservations.

After filling out the reservation form, the user may select button 242 using cursor 204 to confirm the reservation. As another option, the user may select button 244 using cursor 204 to close the reservation form and return to webpage 218 as shown in FIG. 2B. For example, the user may select button 244 to perform another search, reserve a parking space at another business, and/or reserve a parking space for another date.

Figure 3:
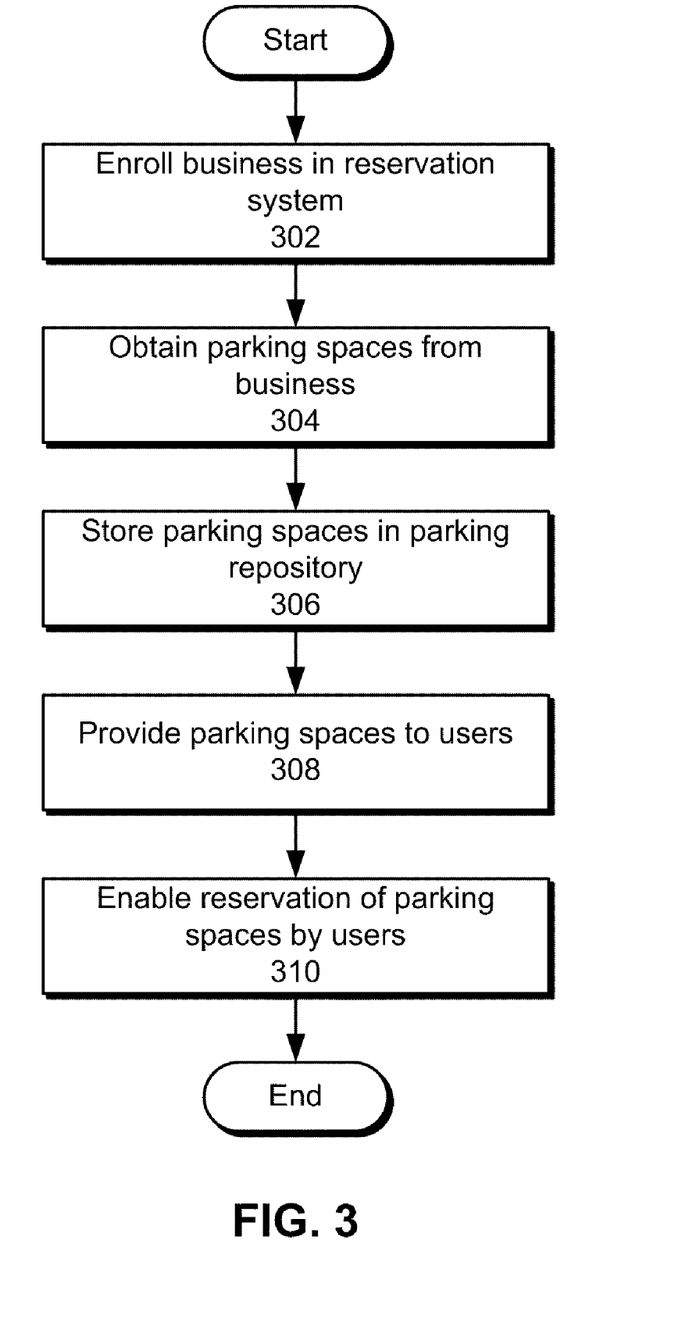
FIG. 3 shows a flowchart illustrating the process of facilitating parking usage for a business in accordance with an embodiment of the present invention.

FIG. 3 shows a flowchart illustrating the process of facilitating parking usage for a business in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

First, a business is enrolled in a reservation system (operation 302). The business may enroll by creating an account with the reservation system and providing business data associated with the business, including a business name, a business location, contact information, business hours, and/or a business description. Next, a set of parking spaces is obtained from the business (operation 304). The parking spaces may correspond to parking spaces the business would like to list with the reservation system. Furthermore, the parking spaces may be located in a public parking garage or private parking lot.

The parking spaces are stored in a parking repository (operation 306), such as parking repository 128 of FIG. 1. The parking spaces are also provided to users (operation 308) of the reservation system. For example, the parking spaces may be shown on a map in response to a search for available parking by a user. Finally, reservation of parking spaces by the users is enabled (operation 310) so that parking usage may be facilitated for both the users and the business. In particular, enabling reservations of parking spaces by the users may involve tracking the number of available parking spaces from the parking spaces, tracking an availability of a specific parking space from the parking spaces, and/or conducting an auction for one or more of the parking spaces.

Figure 4:
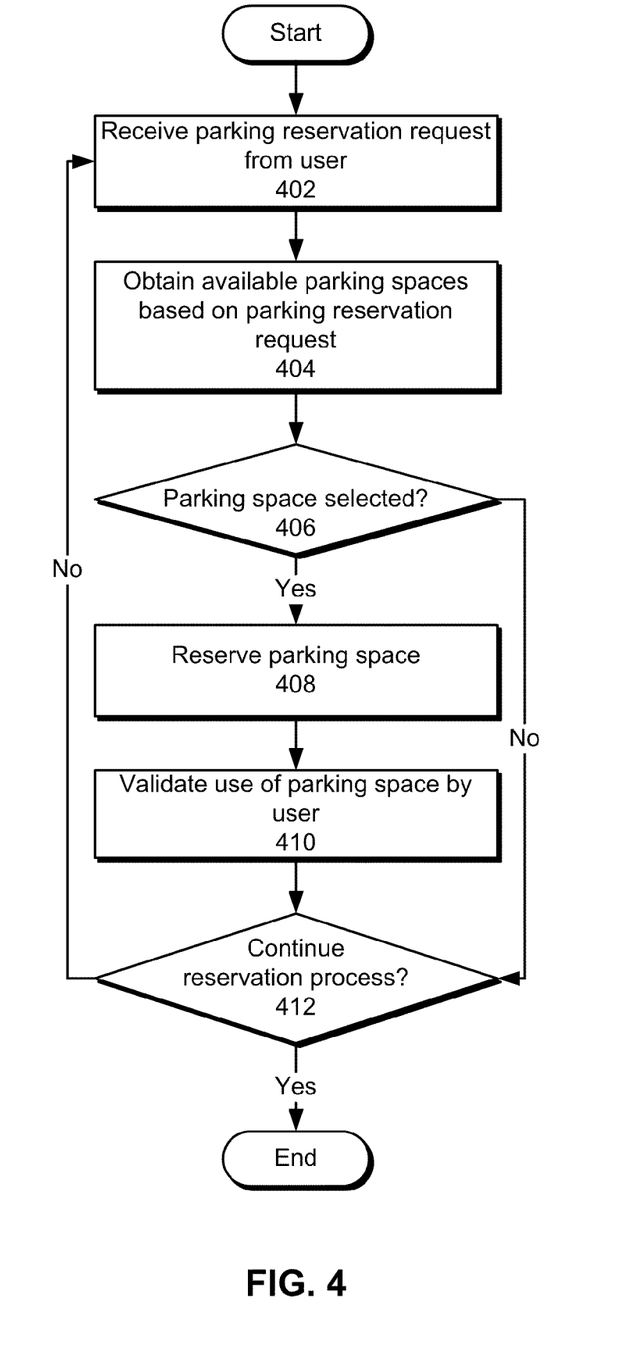
FIG. 4 shows a flowchart illustrating the process of facilitating parking usage for a user in accordance with an embodiment of the present invention.

FIG. 4 shows a flowchart illustrating the process of facilitating parking usage for a user in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

Initially, a parking reservation request is received from a user (operation 402). The parking reservation request may correspond to a search for available parking based on one or more search parameters, such as location, time, duration, price, activity, and/or event. Next, a set of available parking spaces is obtained based on the parking reservation request (operation 404). For example, the available parking spaces may be obtained based on proximity to a certain event on a certain date.

The user may select a parking space from the available parking spaces (operation 406). For example, the user may select a parking space if the parking space satisfies the user's criteria for price, location, security, size, and/or weather protection. If the user does not select a parking spot, the user may continue the reservation process (operation 412) by making another parking reservation request (operation 402). The user may also exit the reservation process without making additional parking reservation requests.

If the user selects a parking space, the parking space is reserved (operation 408) for the user. The parking space may correspond to a specific parking space within a parking garage or parking lot (e.g., corner parking space closest to the entrance), or the parking space may correspond to one of a number of unspecified available parking spaces within the parking garage or parking lot. Moreover, reserving the parking space may involve receiving payment for the parking space from the user and identifying the user using authentication credentials such as the user's phone number, login, license plate number, credit card number, identification card, and/or vehicle transponder.

The use of the parking space by the user may also be validated (operation 410) using the authentication credentials. For example, the user's license plate number, vehicle transponder, identification card, and/or credit card number may be checked prior to permitting access to the parking space by the user. As a result, individuals who do not hold authentication credentials that match the authentication credentials for the reserved parking space may be denied use of the parking space during the reservation period of the parking space.

The user may continue the reservation process (operation 412) after reserving the parking space. For example, the user may reserve parking spaces for other dates, times, and/or locations. To continue the reservation process, the user may make parking reservation requests and view available parking spaces based on the parking reservation requests (operation 402-404). The user may also select (operation 406) and reserve parking spaces (operation 408) from the available parking spaces that fit the user's criteria. Finally, the user may be validated prior to using the reserved parking spaces (operation 410) using authentication credentials associated with the parking space reservations.

Figure 5:
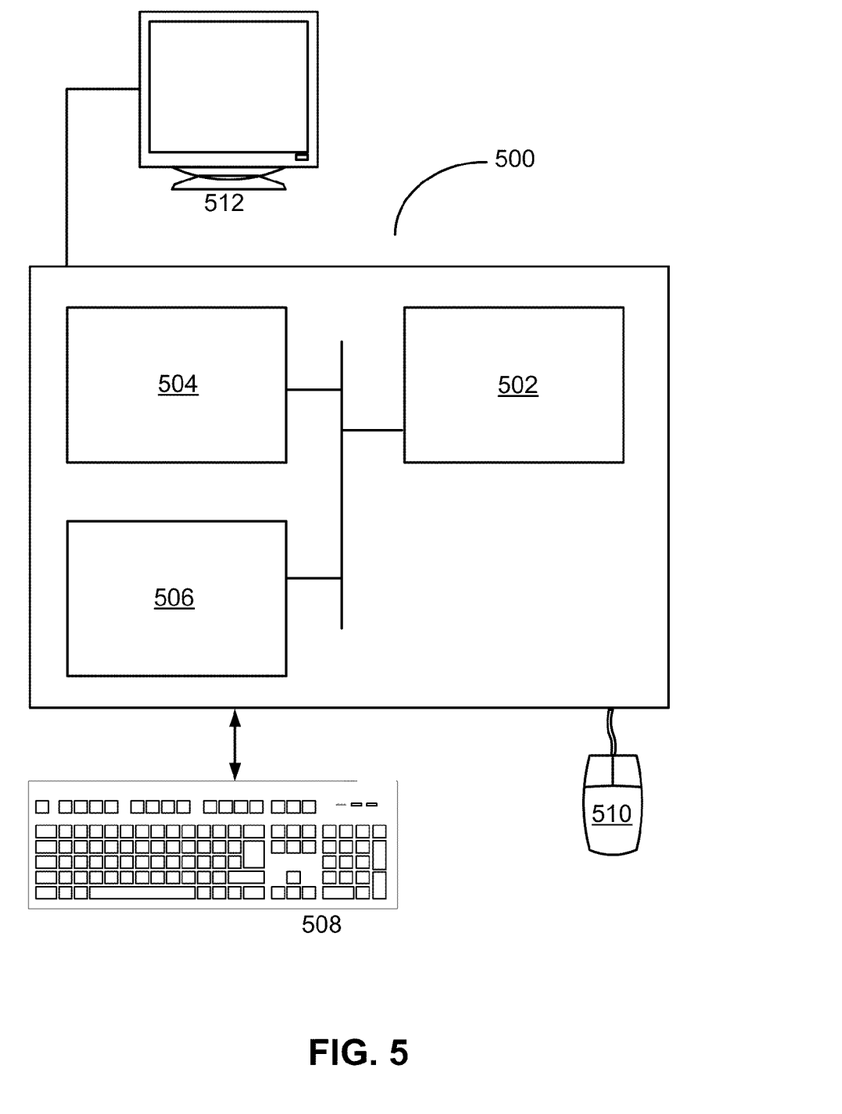
FIG. 5 shows a computer system in accordance with an embodiment of the present invention.

FIG. 5 shows a computer system 500 in accordance with an embodiment of the present invention. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present invention. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

For example, computer system 500 may execute an application that implements a reservation system for facilitating parking usage by providing parking spaces from businesses to users and reserving the parking spaces for the user. On the other hand, computer system 500 may execute an application that provides a business user interface for interacting with the businesses, or computer system 500 may execute an application that provides a customer user interface for interacting with the users. Finally, computer system 500 may implement a parking repository and/or business data repository by storing relevant data on storage 506 and executing an application to manage the data.

In addition, one or more components of computer system 500 may be remotely located and connected to the other components over a network. Portions of the present invention (e.g., reservation system, business user interface, customer user interface, etc.) may also be located on different nodes of a distributed system that implements the invention.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating parking usage, comprising:
enrolling a plurality of businesses into a parking reservation system, wherein each business in the plurality of businesses has a set of parking spaces;
obtaining one or more parking spaces from each business for use by a user of the parking reservation system;
storing the obtained parking spaces in the parking reservation system;
receiving a parking reservation request from the user;
obtaining a set of available parking spaces based on the parking reservation request;
providing the available parking spaces to the user;
obtaining, from the user, a selection of a parking space from the available parking spaces; and
reserving the parking space for the user.

2. The method of claim 1, further comprising:
validating the use of the parking space by the user.

3. The method of claim 2, wherein the user is validated with at least one of a phone number, a login, a license plate number, a credit card number, an identification card, and a vehicle transponder.

4. The method of claim 1, wherein reserving the parking space for the user involves at least one of:
reserving a specific parking space from the available parking spaces for the user;
decreasing a number of the available parking spaces;
conducting an auction for the selected parking space from the user;
receiving payment from the user; and
identifying the user.

5. The method of claim 1, wherein the parking reservation request is associated with at least one of a location, a time, a duration, a price, an activity, and an event.

6. The method of claim 1, wherein providing the available parking spaces to the user involves displaying the available parking spaces on a map.

7. The method of claim 1, wherein the selection of the parking space is obtained using at least one of a webpage, an email, a phone call, and a Short Message Service (SMS) transmission.

8. The method of claim 1, wherein obtaining the set of available parking spaces involves at least one of:
tracking a number of available parking spaces from the parking spaces stored in the parking reservation system; and
tracking an availability of a specific parking space from the parking spaces stored in the parking reservation system.

9. The method of claim 1, wherein each business is associated with at least one of a private parking lot and a public parking garage.

10. The method of claim 1, wherein one or more businesses in the plurality of businesses make available only a subset of their available parking spaces to the parking reservation system.

11. The method of claim 1, wherein each business in the plurality of businesses specifies a set of users of the parking reservation system that can use the set of parking spaces provided by the business.

12. The method of claim 1, wherein each business in the plurality of businesses specifies a schedule of fees for the set of parking spaces provided by the business.

13. A system for facilitating parking usage, comprising:
a parking repository comprising a set of parking spaces;
a customer user interface, comprising:
a search module configured to:
receive a parking reservation request from a user; and
obtain a set of available parking spaces from the parking spaces based on the parking reservation request; and
a selection module configured to:
provide the available parking spaces to the user; and
obtain, from the user, a selection of a parking space from the set of available parking spaces;
a reservation system configured to reserve the parking space for the user;
a business user interface, comprising:
an enrollment module configured to enroll a plurality of businesses into the reservation system, wherein each business in the plurality of businesses has a set of parking spaces; and
a parking management module configured to obtain one or more parking spaces from each business for use by the user of the reservation system; and the reservation system further configured to store the one or more parking spaces in the parking repository.

14. The system of claim 13, wherein the reservation system is further configured to validate the use of the parking space by the user.

15. The system of claim 14, wherein the user is validated with at least one of a phone number, a login, a license plate number, a credit card number, an identification card, and a vehicle transponder.

16. The system of claim 13, wherein reserving the parking space for the user involves at least one of:
reserving a specific parking space from the available parking spaces for the user;
decreasing a number of the available parking spaces;
conducting an auction bid for the selected parking space from the user;
receiving payment from the user; and
identifying the user.

17. The system of claim 13, wherein the parking reservation request is associated with at least one of a location, a time, a duration, a price, an activity, and an event.

18. The system of claim 13, wherein the selection of the parking space is obtained using at least one of a webpage, an email, a phone call, and a Short Message Service (SMS) transmission.

19. A computer-readable storage medium storing instructions that when executed by a computer cause the computer to perform a method for facilitating parking usage, the method comprising:
enrolling a plurality of businesses into a parking reservation system, wherein each business in the plurality of businesses has a set of parking spaces;
obtaining one or more parking spaces from each business for use by a user of the parking reservation system;
storing the obtained parking spaces in the parking reservation system;
receiving a parking reservation request from a user;
obtaining a set of available parking spaces based on the parking reservation request;
providing the available parking spaces to the user;
obtaining, from the user, a selection of a parking space from the available parking spaces; and
reserving the parking space for the user.

20. The computer-readable storage medium of claim 19, the method further comprising:
validating the use of the parking space by the user.

21. The computer-readable storage medium of claim 20, wherein the user is validated with at least one of a phone number, a login, a license plate number, a credit card number, an identification card, and a vehicle transponder.

22. The computer-readable storage medium of claim 19, wherein reserving the parking space for the user involves at least one of:
reserving a specific parking space from the available parking spaces for the user;
decreasing a number of the available parking spaces;
conducting an auction for the selected parking space from the user;
receiving payment from the user; and
identifying the user.

23. The computer-readable storage medium of claim 19, wherein the parking reservation request is associated with at least one of a location, a time, a duration, a price, an activity, and an event.

* * * * *